United States Patent [19]
Naoe et al.

[11] Patent Number: 5,997,153
[45] Date of Patent: *Dec. 7, 1999

[54] LIGHT SOURCE DEVICE FOR AN IMAGE FORMING APPARATUS

[75] Inventors: Yasuhiro Naoe, Sagamihara; Akio Yashiba, Yokohama; Hideyasu Yamanaka, Ayase, all of Japan

[73] Assignee: Ricoh Company, Ltd., Tokyo, Japan

[*] Notice: This patent is subject to a terminal disclaimer.

[21] Appl. No.: 09/042,736

[22] Filed: Mar. 17, 1998

Related U.S. Application Data

[63] Continuation of application No. 08/675,722, Jul. 2, 1996, Pat. No. 5,758,950.

[30] Foreign Application Priority Data

| Mar. 5, 1996 | [JP] | Japan | 8-47319 |
| Mar. 5, 1996 | [JP] | Japan | 8-47321 |
| Mar. 5, 1996 | [JP] | Japan | 8-47322 |

[51] Int. Cl.[6] .................................................. F21K 7/00
[52] U.S. Cl. .............................................. 362/259; 362/455
[58] Field of Search ..................................... 362/259, 268, 362/335, 800, 455

[56] References Cited

U.S. PATENT DOCUMENTS

| 5,490,128 | 2/1996 | Ogata .................................. 362/259 X |
| 5,617,441 | 4/1997 | Nakata et al. ...................... 362/259 X |
| 5,758,950 | 6/1998 | Naoe et al. ............................. 362/259 |

*Primary Examiner*—Stephen Husar
*Attorney, Agent, or Firm*—Oblon, Spivak, McClelland, Maier & Neustadt, P.C.

[57] ABSTRACT

A light source device for use in an image forming apparatus and using a semiconductor laser is disclosed. The device needs a minimum of constituent parts and frees the individual part from dislocation in the event of assembly. A collimator lens included in the device is fixed in place by photo-curable adhesive. The device is low cost and highly accurate.

24 Claims, 12 Drawing Sheets

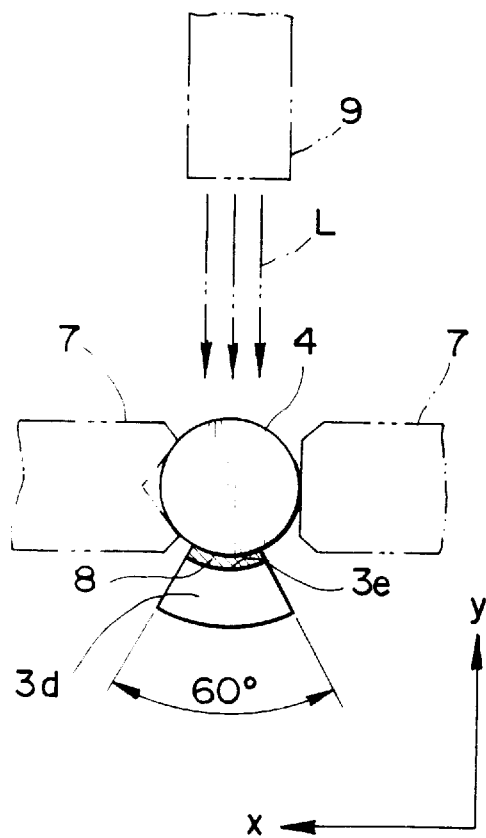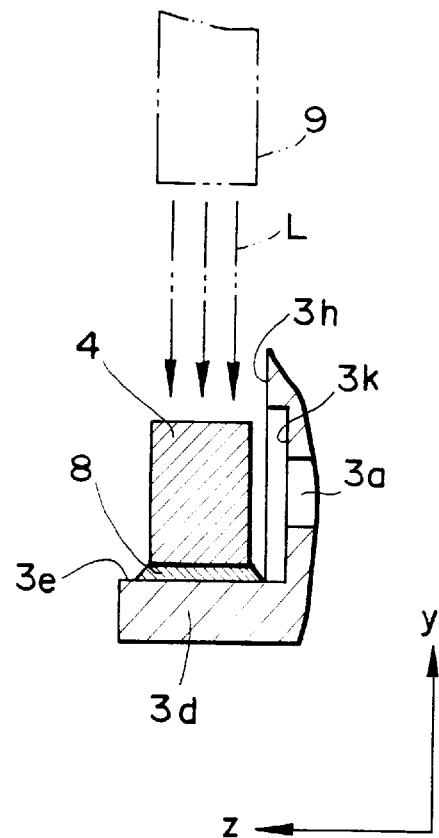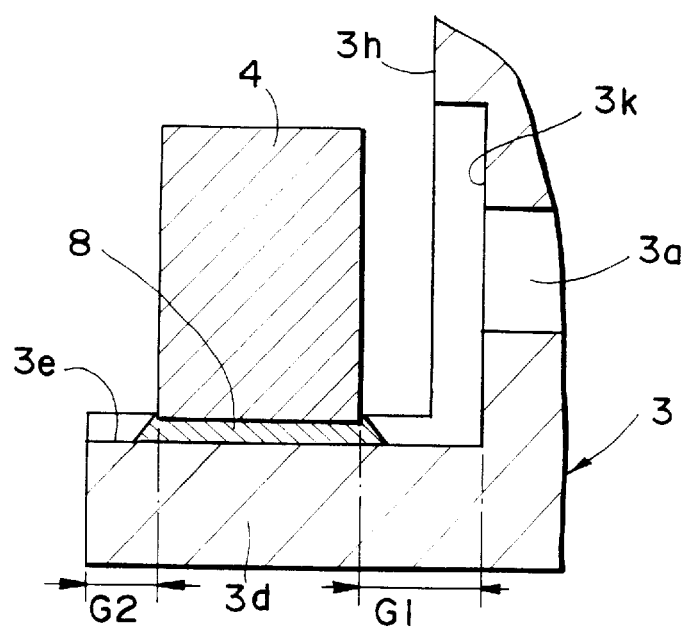

LIGHT SOURCE DEVICE FOR AN IMAGE FORMING APPARATUS

This application is a continuation of application Ser. No. 08/675,722, filed on Jul. 2, 1996, U.S. Pat. No. 5,758,950.

BACKGROUND OF THE INVENTION

The present invention relates to a light source device for use in an image forming apparatus and using a semiconductor laser.

A digital copier, laser printer, facsimile apparatus or similar image forming apparatus extensively used today includes a light source device having a semiconductor laser and a collimator lens. Optical characteristics required of the light source device include the directivity of laser light (optical axis characteristic) and the parallelism of a beam (collimation characteristic). To meet these requirements, it is a common practice to adjust the relative position of the emission point of the laser and the collimator lens in the directions of three axes (x, y and z). The positional accuracy is severely restricted to below the order of microns. Therefore, the device using the laser and collimator lens must be capable of being adjusted in the three axis directions and then fixed at its adjusted position.

When the collimator lens is fixed in place by adhesive, the adhesive contracts in the event of setting. It is therefore necessary to reduce the influence of the contraction on the optical characteristics as far as possible. Particularly, high accuracy is required of the device in the direction z (optical axis direction), so that the contraction should preferably be prevented from occurring in the direction z. For this purpose, the adhesive layer should preferably extend substantially parallel to the optical axis (axis z). Also, the contraction should preferably be limited to one of the directions x and y in order to facilitate adjustment even in such a direction.

Light source devices each having a semiconductor laser and a collimator lens are taught in, e.g., Japanese Patent Laid-Open Publication Nos. 5-88061, 5-136952, and 5-273483. However, the conventional devices of the type described have some problems yet to be solved, as follows:

(1) Each device needs a number of constituent parts which increase the cost.

(2) The constituent parts are dislocated in the directions x, y and z in the event of assembly, so that the directivity (optical axis characteristic) of the laser is deteriorated.

(3) Use cannot be made of ultraviolet light curable adhesive for fixing the collimator lens in place. This kind of adhesive can set in a short period of time in a desired manner and is highly reliable.

The conventional devices have other problems which will be described, in addition to the above problems.

SUMMARY OF THE INVENTION

It is therefore an object of the present invention to provide an inexpensive and highly accurate light source device needing a minimum number of constituent parts, protecting the individual part from dislocation during assembly, and allowing a collimator lens to be fixed in place by photo-curable adhesive.

In accordance with the present invention, a light source device has a flat base member having a through bore. A semiconductor laser for emitting laser light is mounted on the rear of the base member and fitted in the through bore. A lens is mounted on the front of the base member at the front of the through bore and coaxial with the optical axis of the semiconductor laser. A lens support member is positioned at the front of the through bore coaxially with the optical axis of the semiconductor laser. The lens support member has an arcuate section and a diameter slightly greater than the outside diameter of the lens. The lens is affixed to the lens support member by photo-curable adhesive.

Also, in accordance with the present invention, a light source device has a base member having a through bore substantially at the center thereof. A semiconductor laser is fitted in the through bore for emitting laser light. A lens is mounted on the surface of the base member. A lens support member supports the lens positioned in the directions of three axes with adhesive filling a clearance between the lens and the surface of the base member.

Further, in accordance with the present invention, a light source device has a semiconductor laser for emitting laser light, a first support member supporting the semiconductor laser, a lens positioned coaxially with the optical axis of the semiconductor laser, and a second support member supporting the lens. The first support member has a first reference surface perpendicular to the optical axis of the semiconductor laser. The second support member has a second reference surface parallel to the optical axis of the semiconductor laser.

Moreover, in accordance with the present invention, a light source device has a semiconductor laser for emitting laser light, a first support member supporting the semiconductor laser, a lens positioned coaxially with the optical axis of the semiconductor laser, a second support member supporting the lens, an aperture forming member having an aperture for shaping the laser light issuing from the semiconductor laser, and a third support member supporting the aperture forming member on the second support member from below the second support member. The first support member is positioned perpendicularly to the optical axis while the second support member is located in front of the first support member.

BRIEF DESCRIPTION OF THE DRAWINGS

The above and other objects, features and advantages of the present invention will become apparent from the following detailed description taken with the accompanying drawings in which:

FIG. 5 is a front view of a collimator lens and a lens support portion also included in the first embodiment;

FIG. 6 is a section of the collimator lens and lens support portion shown in FIG. 5;

FIGS. 7–13 are sections each showing a particular configuration of non-adhesion portions included in the lens support portion;

DESCRIPTION OF THE PREFERRED EMBODIMENTS

To better understand the present invention, a brief reference will be made to a conventional light source device of the type having a semiconductors laser and a collimator lens, shown in FIG. 1. This type of light source device is taught in, e.g., previously mentioned Japanese Patent Laid-Open Publication No. 5-88061.

Figure 1:
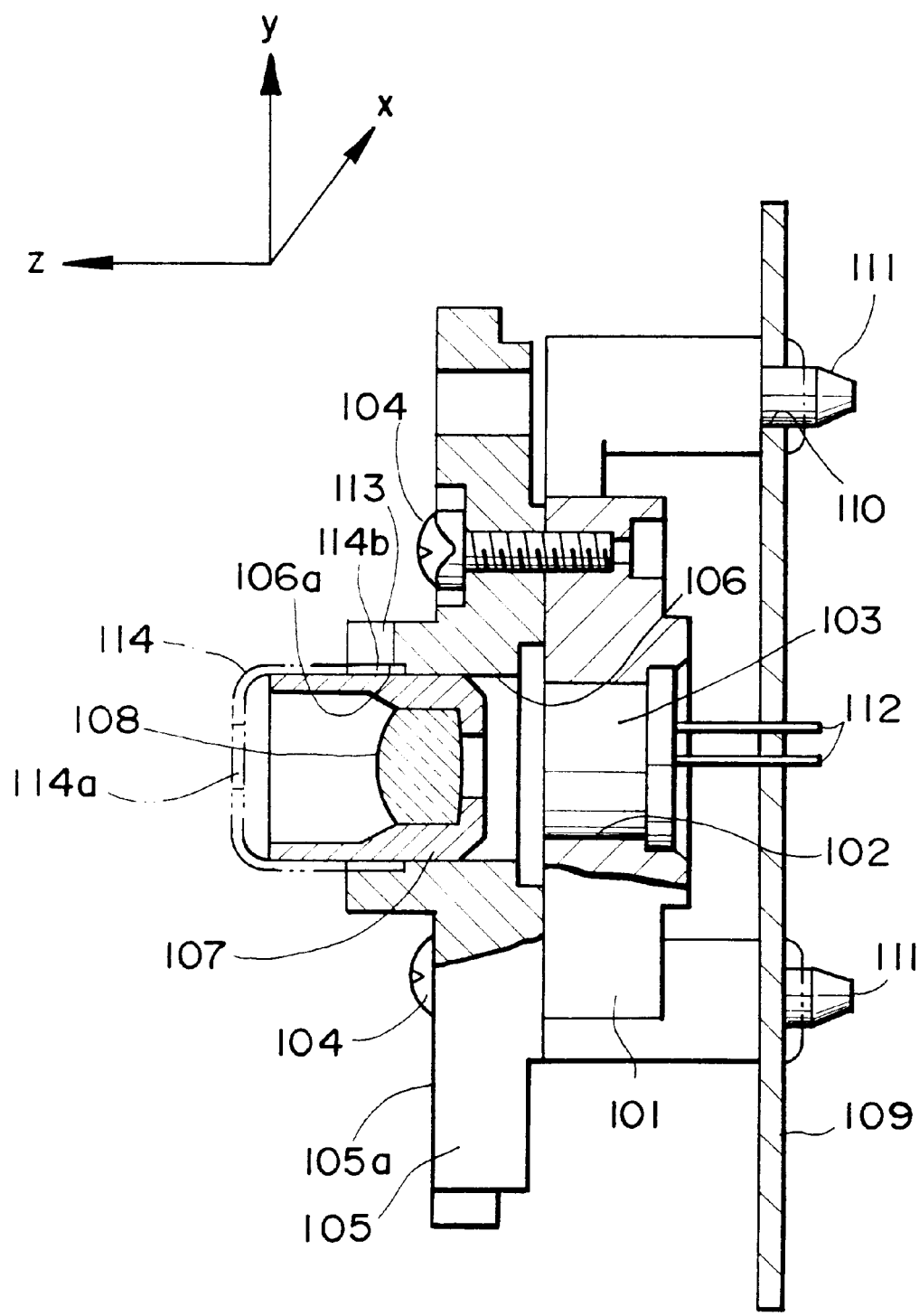
FIG. 1 is a vertical section showing a conventional light source device.

As shown in FIG. 1, the light source device has a base or support member 101 formed with a stepped through bore 102. A semiconductor laser 103 for emitting laser light is press fitted in the bore 102. For the base 101, use is made of resin for low cost or of aluminum or similar metal for precision, as needed. A flange 105 is fastened to the base 101 by two screws 104. A bore 106 is formed in the flange 105 in alignment with the bore 102 of the base 101. The bore 106 merges into an inlet portion 106a located at the left-hand side of the bore 106, as viewed in FIG. 1. The inlet portion 106a is about 1 mm greater in diameter than the bore 106. A hollow cylindrical lens holder 107 is received in the bore 106 and spaced from the wall of the bore 106 by a clearance of about 0.01 mm to 0.03 mm. A collimator lens 108 is fixed in place in the lens holder 107 in order to transform the laser light to a parallel beam.

A printed circuit board 109 is formed with positioning holes 110. Guide pins 111 protruding from the end of the base 101 are respectively received in the holes 110. The tips of the guide pins 111 are deformed by heat, as indicated by dash-and-dots lines in FIG. 1. As a result, the base 101 and circuit board 109 are affixed together. Leads 112 extending out from the laser 103 are passed through lead holes formed in the circuit board 109 and soldered to a conductive wiring pattern formed on the rear of the circuit board 109. If the base 101 is made of metal, then the guide pins 111 will be replaced with threaded holes formed in the end of the base 101. In this case, the base 101 and circuit board 109 will be fastened to each other by screws.

The flange 105 is accurately positioned such that the emission point of the laser 103 aligns with the optical axis of the collimator lens 108. In this condition, the flange 105 is fastened to the base 101 by the screws 104. The flange 105 has a notch 113 communicated to the inlet portion 106a. After the lens holder 107 has been positioned in the direction z such that the emission point of the laser 103 coincides with the focus of the collimator lens 108, adhesive is introduced into the flange 105 via the notch 113. As a result, the lens holder 107 is affixed to the flange 105 by the adhesive.

An aperture forming member 114 plays the role of a shield cap for separating the central parallel part of the beam transmitted through the collimator lens 108, i.e., for thereby shaping the beam. The aperture forming member 114 has an aperture 114a for shaping the beam, and a projection 114b. The member 114 is affixed to the flange 105 with its projection 114b mating with the notch 113.

When the above light source device is mounted to the body of a copier, laser printer or similar image forming apparatus, a flat surface 105a included in the flange 105 and perpendicular to the optical axis is used as a reference surface. The surface 105a is also used as a reference for the adjustment of optical characteristics.

Figure 2:
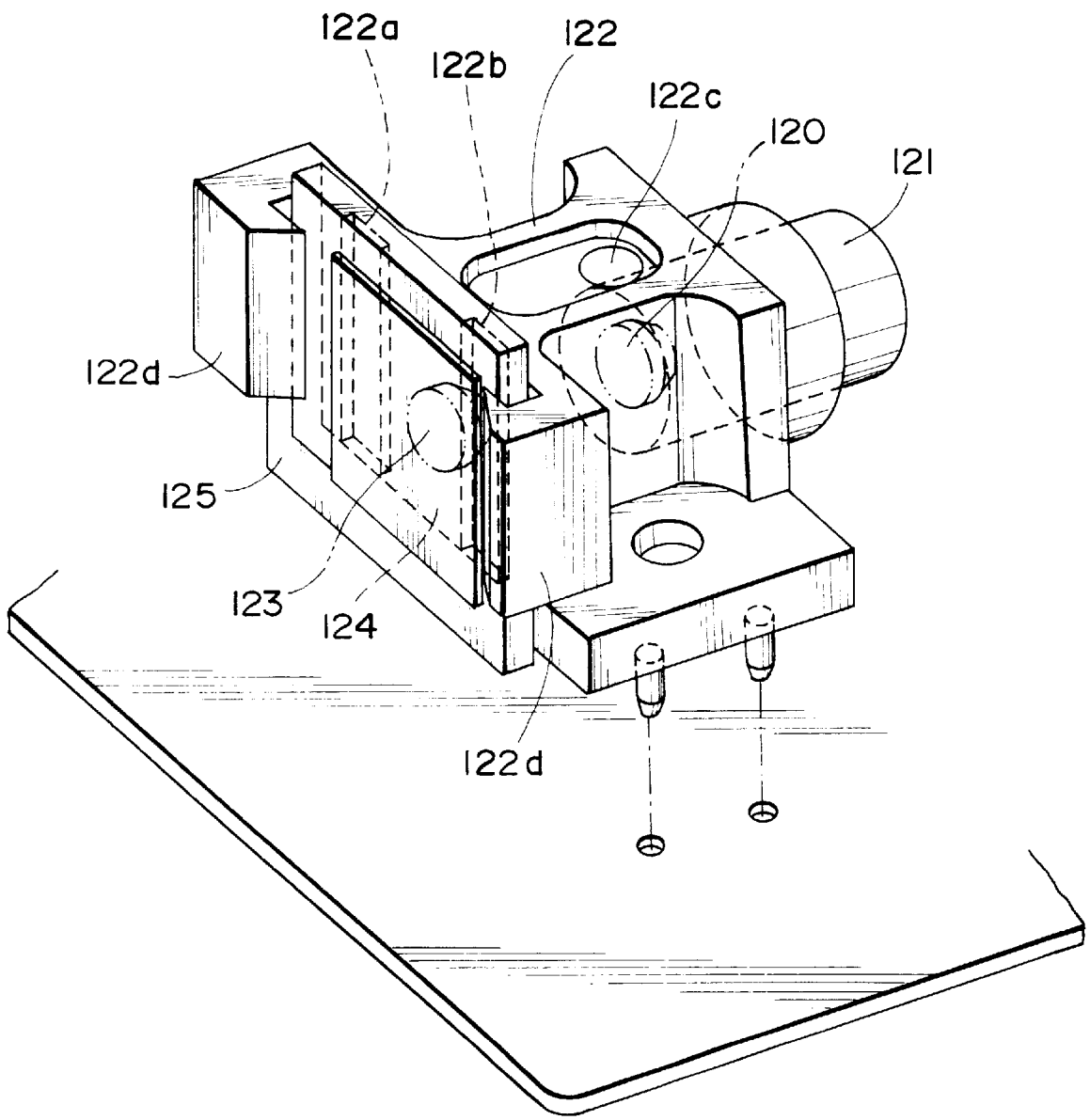
FIG. 2 is an external perspective view showing another conventional light source device.

FIG. 2 shows another conventional light source device taught in, e.g., previously mentioned Japanese Patent Laid-Open Publication No. 5-136952 or 5-273483. As shown, the light source device has a barrel 121 holding a collimator lens 120. The barrel 121 is received in a holder 122. A semiconductor laser 123 is mounted on a printed circuit board 124 which is in turn affixed to a base 125. The base 125 is retained by pawl-like projections 122d extending from the holder 122. Adhesive is introduced into grooves 122a and 122b and a hole 122c formed in the holder 122. As a result, the base 125 and barrel 121 are affixed to the holder 122 by the adhesive.

The conventional devices described above, particularly the device shown in FIG. 1, have the following problems left unsolved.

(1) The adjustment in directions x and y (optical characteristic) and the adjustment in the direction z (collimation characteristic or focal direction) are each effected by a respective structure. This increases the number of structural parts and therefore the production cost of the device.

(2) The outside diameter of the lens holder 107 and the inside diameter of the bore 106 of the flange 105 must have strict accuracy. This increases the production cost of the lens holder 107 and flange 105.

(3) After the adjustment in the directions x and y, the flange 105 is fastened to the base 101 by the screws 104. Therefore, when the screws 104 are driven into the flange 105 and base 101, screw seats provided on the end of the base 101 and the flange 105 bite into each other. This is apt to bring about dislocation in the directions x and y, thereby lowering the accuracy of the directivity (optical axis characteristic) of the laser.

(4) Because the laser light issuing from the laser 103 has a certain spread, it is not always entirely incident on the collimator lens 108. Lasers in general are restricted by legal safety standards. It is preferable that a laser beam issuing from a laser be prevented from leaking in directions other than the direction of an optical axis. This is true not only when the laser is in use but also when adjustment is effected on the production line. Therefore, the flange 105 and base 101 must be made of materials which intercept the laser beam.

(5) The adhesive for affixing the lens holder 107 should preferably be ultraviolet light curable. This kind of adhesive hardens rapidly in a desired manner and is therefore desirable from the production time and reliability standpoint. However, because the base 101 and flange 105 are made of materials opaque to ultraviolet rays, ultraviolet rays cannot uniformly illuminate the entire adhesive even even if radiated via the clearance through which the adhesive has been introduced. This results in irregular hardening and unhardened portions. Consequently, strains ascribable to contraction caused by hardening act unevenly on the assembly, resulting in the dislocation of the lens holder 107 and the cracks of the structural parts. Materials opaque to the laser light, which may be infrared rays or red light, issuing from the laser 103 are, of course, opaque to ultraviolet rays having a longer wavelength than the laser light. Therefore, to transmit only ultraviolet rays, there is needed a special filter or a special coating on the flange 105, increasing the cost to a noticeable degree. This obstructs the use of the ultraviolet light curable adhesive.

(6) Because the adhesive exists on the entire periphery of the lens holder 107, i.e., in both the direction x and the direction y, the direction of the contraction of the adhesive is not limited to the direction x or y. As a result, the positioning accuracy is irregular in the directions x and y. To guarantee the positional accuracy after the adhesion, it is necessary to provide the initial position with an offset taking account of a certain degree of contraction. However, because the direction of contraction is not fixed, it is difficult to implement the offset. This sometimes lowers the accuracy of the directivity of the laser (optical axis characteristic).

(7) Because the adhesive is introduced via the notch 113, it is apt to partly solidify or contract or to flow in an irregular manner. As a result, a strain occurs in the optical axis direction (direction z) and renders positional accuracy irregular.

(8) The light source device is disposed in the body of an image forming apparatus. Because the temperature in the apparatus body is usually high, the device is also subjected to high temperature during the course of operation. This, coupled with the fact that the laser 103 itself generates heat, elevates the temperature of the device. The prerequisite is therefore that the relative position of the laser 103 and lens 108 adjusted in the directions x, y and z be surely held in a certain range even at high temperatures. Particularly, the displacement in the direction of optical axis (direction z) is severely restricted. Under these circumstances, if the base 101 is formed of ordinary resin to meet the cost reduction requirement, then its heat radiation ability is lowered and deteriorates the characteristic of the entire assembly in a high temperature environment. Furthermore, the portions of the base 101 and flange 105 fastened by the screws 104 are not strong, so that the relative position of the laser 103 and lens 108 is apt to vary due to the fastening torque. Particularly, when a thermal stress is applied to the assembly, the base 101, flange 105 and screws 104 each expands to a particular degree due to the respective coefficient of thermal expansion. As a result, after the application of the thermal stress, the fastening stress and therefore the relative position of the laser 103 and lens 108, i.e., the collimation characteristic is apt to vary. In light of this, the base 101, flange 105 and screws 104 may all be formed of the same material having a single coefficient of linear expansion. However, if the base 101 and flange 105 are formed of resin, the screws 104 must also be formed of the same resin, resulting in an increase in cost.

(9) The laser 103 for the light source device is provided with various kinds of configurations, depending on the configuration of an image forming apparatus, among others. For example, a case surrounding the laser 103 may be used as a power source terminal (e.g. 5V). In this case, however, the laser 103 does not emit light when the case surrounding it is brought to the ground level. It is therefore necessary to isolate the case from the ground level not only when the device is assembled but also when it is mounted to the apparatus body. If the base 101 and flange 105 are formed of metal radiating heat efficiently, then the device must include a portion for insulating the case of the laser 103 because the entire device is conductive. In addition, the base 101, flange 105 and screws 104 must be formed of the same metal at the sacrifice of cost, as stated in the above item (8).

(10) To adjust the focus of the collimator lens 108 (direction z), the parallelism (collimation characteristic) of the laser beam shaped by the aperture 114a is detected. Generally, because the laser beam coming out of the aperture 114a tends to spread due to diffraction, the parallelism of the beam differs from the case including the aperture 114a to the case lacking it. Further, the degree of parallelism depends on the characteristic of the individual laser 103. The parallelism of the laser beam necessary for the light source device is the characteristic of the beam coming out of the aperture 114a; that is, the light transmitted through the peripheral portion of the lens 108 is not necessary. The peripheral portion of the lens 108 is noticeably affected by aberration and greatly differs from one lens to another lens. Therefore, even when the parallelism of the entire beam is detected and satisfies the required accuracy. It is sometimes unsatisfactory when it comes to the part of the beam around the center. It follows that ideally the focus of the lens 108 should be adjusted after the aperture forming member 114 has been mounted. However, because the aperture forming member 114 covers the lens 108, the lens 108 cannot be adjusted after the mounting of the aperture 114a. As a result, the parallelism of the laser beam varies after the mounting of the aperture 114a.

(11) The light source device is fastened to the apparatus body by screws with the surface 105a of the flange 105 serving as a reference. Screws are driven into the reference surface 105a from above the apparatus body or from one side of the apparatus body, depending on the configuration of the apparatus body. However, the device can be fastened only from the side of the apparatus body because the reference surface 105a is perpendicular to the optical axis of the laser beam. When the flange 105 must be fastened from above the apparatus body, an intermediary mounting member is required. This not only increases the cost but also lowers the accuracy of optical axis characteristic due to the intermediary member. As a result, the device lacks in general-purpose applicability. This is also true with the light source device shown in FIG. 2 because it is configured to be mounted from above the apparatus body.

(12) The laser 103 is easily deteriorated or damaged by static electricity or similar electrical noise. Ideally therefore, the device should be assembled and adjusted fully automatically so as to be isolated from static electricity issuing from the human body. The automatic assembly and adjustment will save labor cost and will improve quality and yield of products. In an automatic machine, the reference surface for setting workpieces including light source devices should advantageously be horizontal, considering the loading and unloading of the workpieces. When the production of the light source device having the reference surface 105a perpendicular to the optical axis is automated, it should preferably be set face down (causing the laser beam to issue downward) in order to facilitate the product. However, such a configuration requires the adhesive to be introduced into the assembly downward or sideways after the adjustment of the collimator lens 108. This is not practical, considering the drop of the adhesive. Moreover, the aperture must be mounted to the assembly from below the assembly after the injection of the adhesive, complicating the automatic machine or requiring an extra step.

Preferred embodiments of the light source device in accordance with the present invention will be described which are free from the problems discussed above.

1st Embodiment

Figure 3:
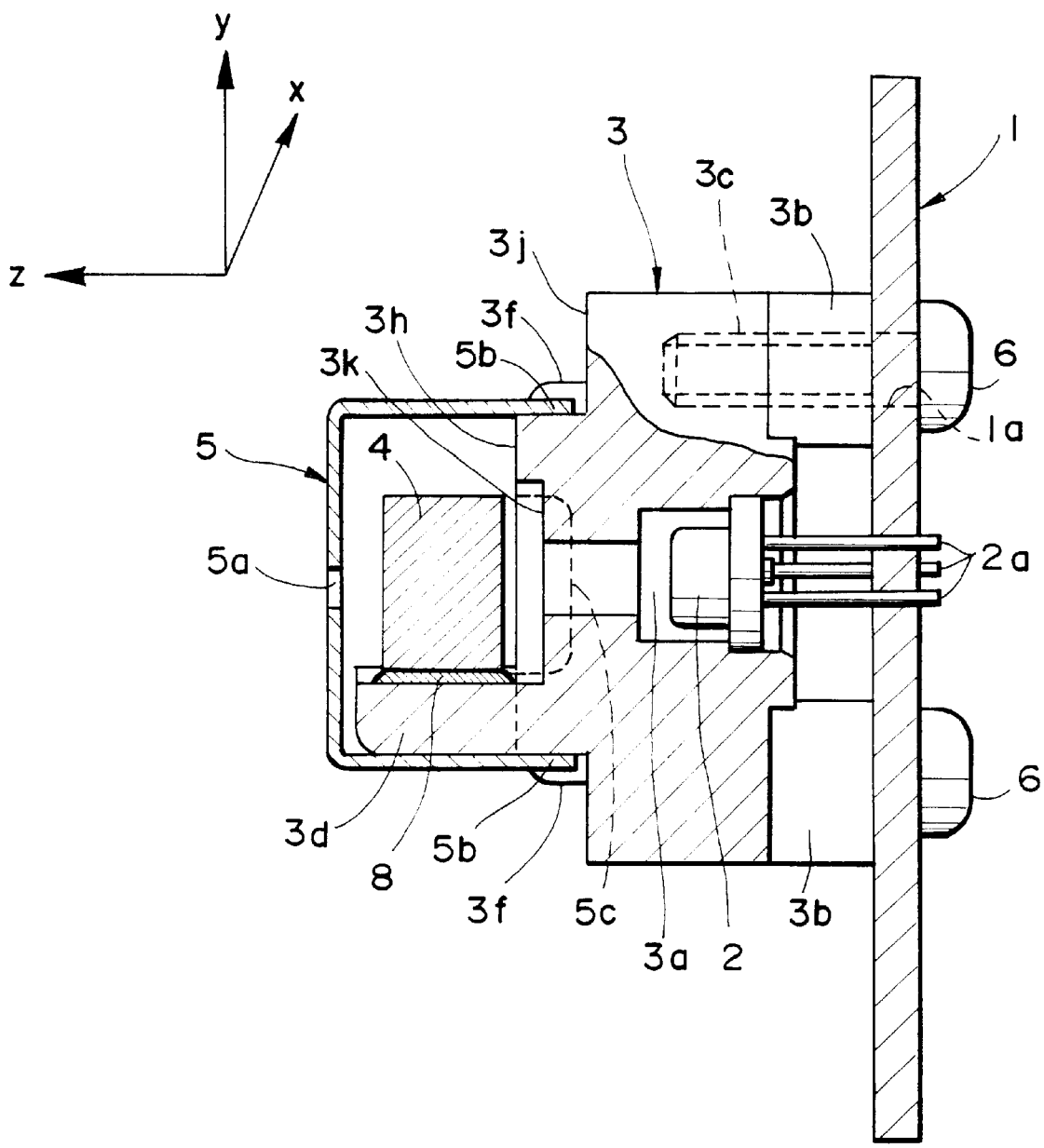
FIG. 3 is a vertical section showing a first embodiment of the light source device in accordance with the present invention.
Figure 4:
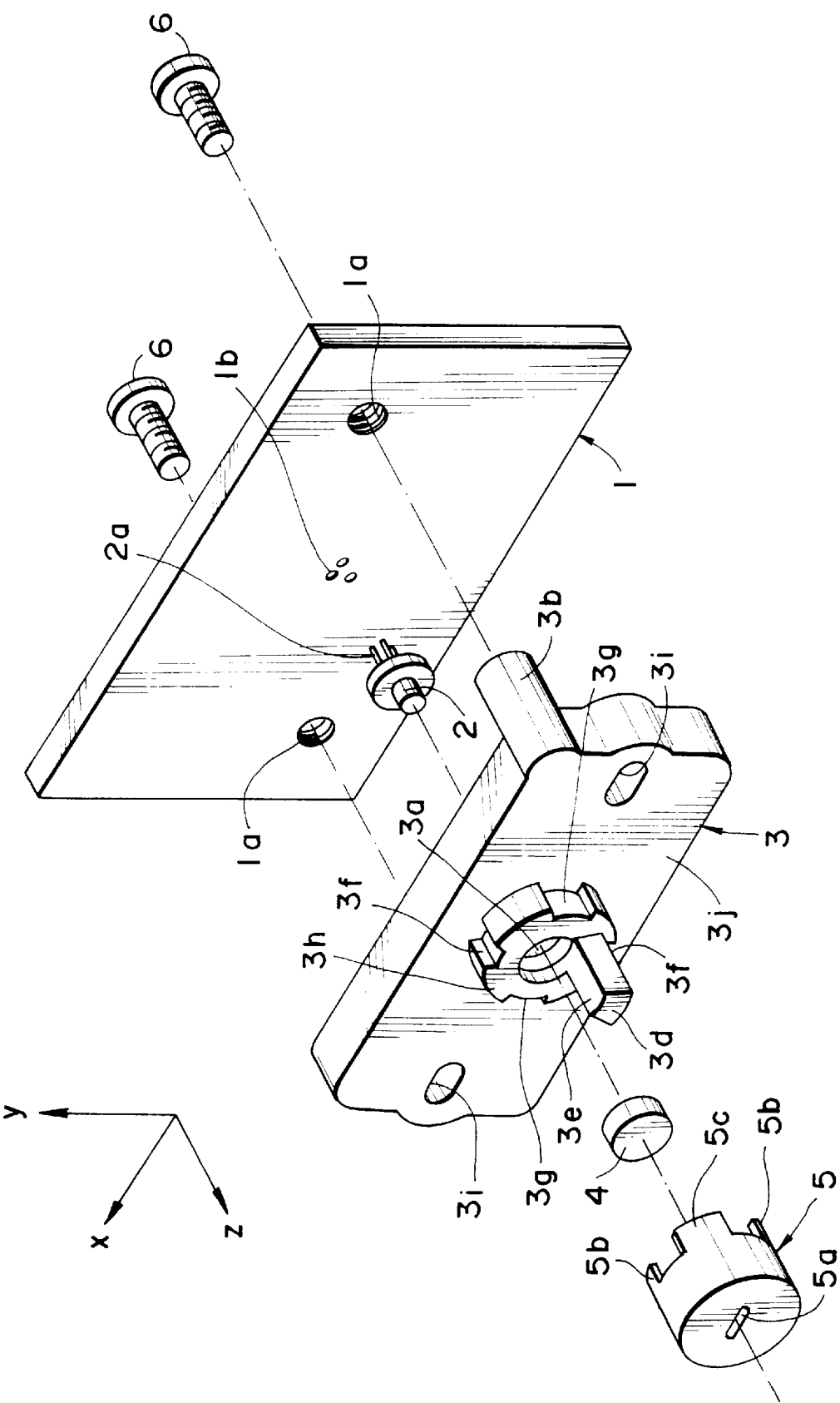
FIG. 4 is an exploded perspective view of the first embodiment.

Referring to FIGS. 3–13, a light source device embodying the present invention is shown. As shown in FIGS. 3 and 4, the device has a printed circuit board 1, a semiconductor laser 2, a flat base 3 for holding the laser 2, a collimator lens 4, and an aperture forming member 5. In the illustrative embodiment, the base 3 is formed of insulating resin having a coefficient of linear expansion of $2.3 \times 10^{-5}/K$ or below, as measured in the optical axis direction, and a thermal conductivity of 0.9 W/m·K or above. This kind of resin surely provides the base 3 with a collimation characteristic and a heat radiation characteristic against changes in temperature. For example, use may be made of unsaturated polyester resin containing glass fibers and satisfying the above conditions. The base 3 is opaque to an infrared laser beam issuing from the laser 2 (e.g. 780 nm) and light shorter in wavelength than the same.

A stepped through bore 3a is formed throughout substantially the center of the base 3. The laser 2 is press fitted in the bore 3a from the rear of the base 3. Because unsaturated polyester resin with glass fibers and constituting the base 3 is insulative, a case surrounding the laser 2 and mounted to the base 3 is fully electrically insulated. This eliminates the need for special insulation otherwise provided on the case of the laser 2.

Two spacers 3b protrude from the rear of the base 3, and each is formed with a threaded bore 3c for affixing the printed circuit board 1. Two through holes 1a are formed in the circuit board 1 in alignment with the spacers 3b. Screws 6 are respectively driven into the threaded bores 3c via the holes 1a, thereby fastening the base 3 and circuit board 1 together. If desired, the threaded holes 3c and screws 6 may be replaced with simple holes and tapping screws, respectively.

Three leads 2a extending out from the laser 2 are respectively passed through lead holes 1b formed in the circuit board 1 and are soldered to a conductive wiring pattern provided on the rear of the circuit board 1.

The collimator lens 4 is directly affixed to the base 3 by adhesive. For this purpose, a lens support portion 3d is formed integrally with the base 3 and coaxially with the optical axis of the laser 2. The lens support portion 3d is positioned at the front of the bore 3a and provided with an arcuate section. This portion 3d is slightly greater in diameter (e.g. about 0.3 mm) than the outside diameter of the collimator lens 4. As shown in FIG. 7, the lens support portion 3d has a length in the optical axis direction (direction z) great enough to form non-adhesion portions G1 and G2. Even when adhesive 8 is applied in an excessive amount, the portions G1 and G2 prevent it from depositing on the other portions. This will be described specifically later. The arc of the lens support portion 3d is smaller than a semicircle, as seen from the front. As shown in FIG. 5, the arc of the lens support portion 3d as viewed in a section should preferably extend over an angle of about 60 degrees and be symmetrical in the right-and-left direction.

The collimator lens 4 is formed of a material transparent to ultraviolet rays. While the lens 4 may be implemented as a plastic lens or a glass lens, a glass lens is superior to a plastic lens as to optical characteristic. As shown in FIG. 5, in the event of assembly, the lens 4 is held by a chuck 7 adjustable in position in the directions x, y and z. Then, the lens 4 is positioned on the lens support portion 3d coaxially with the laser 2. Subsequently, the ultraviolet light curable adhesive 8 is filled in the clearance between the surface 3e of the lens support portion 3d and the outer periphery of the lens 4. Thereafter, the position of the lens 4 is finely adjusted while having its optical characteristic monitored by a testing device, not shown. As soon as the lens 4 is brought to a position where it obtains a desired optical characteristic, the chuck 7 is fixed in place there. Then, as shown in FIGS. 5 and 6, an ultraviolet radiator 9 radiates ultraviolet rays L toward the adhesive 8 from above the collimator lens 4. The ultraviolet rays L are incident to the adhesive 8 by way of the lens 4 and causes it to set uniformly. As a result, an adhesive layer of uniform thickness and symmetrical in the right-and-left direction is formed between the surface 3e of the support portion 3d and the lens 4. The adhesive layer has a thickness equal to the gap between the surface 3e and the lens 4 (about 0.3 mm). The lens 4 is affixed to the support portion 3d by the adhesive layer while maintaining the desired optical characteristics.

Particularly, the arcuate section of the lens support portion 3d which extends over about 60 degrees, as shown in FIG. 5, has the following advantages. The chuck 7 can support the collimator lens 4 surely and easily. Because the ultraviolet rays L issuing from the radiator 9 are uniformly incident to the entire surface 3e view the lens 4, the adhesive 8 can set evenly over its entire area. Such a uniform and fully set adhesive layer prevents the lens 4 from being displaced due to irregular hardening and unhardened portions.

Further, strains ascribable to contraction of the adhesive 8 occur symmetrically in the direction x (right-and-left direction) and therefore cancel each other. As a result, a strain occurs only in the direction y (up-and-down direction). It is therefore possible to provide the initial position of the collimator lens 4 with a slight offset in the direction y before hardening, taking account of the contraction. This enhances the accuracy in the optical characteristic of the lens 4 after fixation.

The base 3 is formed of an insulating material having a particular coefficient of linear expansion in the axial direction and a particular thermal conductivity, as stated earlier. Despite that the laser 2 generates heat, the great thermal conductivity of the base 3 allows the temperature of the light source device to rise only about 5° C. at most above the temperature inside the apparatus body. Moreover, the coefficient of linear expansion of the base 3 is as small as that of aluminum. Hence, even if the temperature of the light source device rises about 5° C., it does not cause the relative position of the laser 2 and lens 4 to change noticeably. In addition, the collimation characteristic of the lens 4 is held stable against changes in temperature.

As shown in FIGS. 3 and 4, the base 3 additionally has an annular stepped portion 3h at the root of the lens support portion 3d. The stepped portion 3h has at its end an annular recess 3k concentric with the bore 3b and greater in diameter than the collimator lens 4. The recess 3k is deep enough to prevent the adhesive 8 from depositing on the surface of the stepped portion or base wall 3h when the adhesive 8 spreads more than the expected degree. Specifically, as shown in FIG. 7, the previously mentioned non-adhesion portion G1 is formed between the surface of the base wall 3h and the lens 4. Further, the tip of the support portion 3d extends forward sufficiently over the lens surface of the lens 4, so that even the adhesive 8 spread excessively toward the tip of the support portion 3d will not drop. Specifically, as shown in FIG. 7, the previously mentioned non-adhesion portion G2 is formed between the tip of the support portion 3d and the lens 4.

Figure 8:
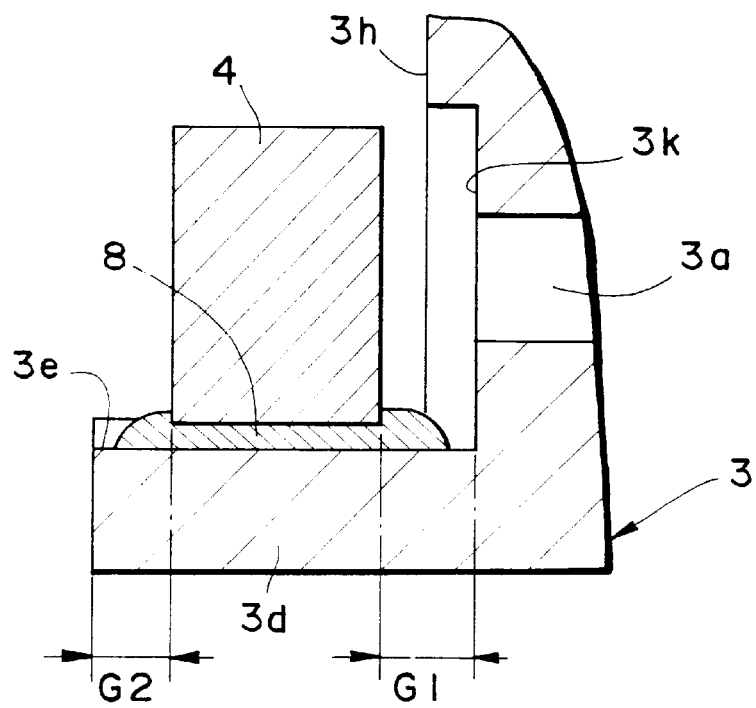
Figure 9:
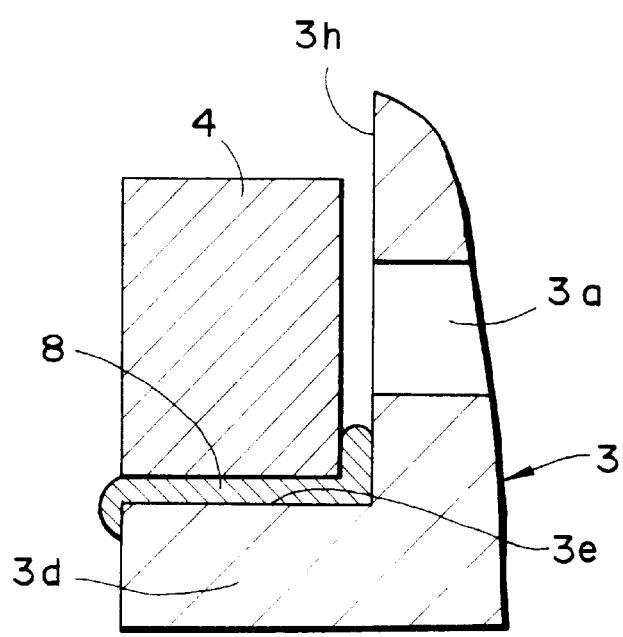

Assume that the adhesive 8 is filled in the gap between the collimator lens 4 and the support portion 3d in an excessive amount. Then, the non-adhesion portions G1 and G2 sandwiching the lens 4 prevent the adhesive 8 from depositing and solidifying on the surface of the base wall 3h or from solidifying while dropping from the tip of the support portion 3d, as shown in FIG. 8. Assume that the above portions G1 and G2 are absent. Then, as shown in FIG. 9, the adhesive 8 fed in an excessive amount deposits and solidifies on the surface of the base wall 3h and solidifies while dropping from the tip of the support portion 3d. As a result, the contraction force of the adhesive 8 derived from hardening and acting in the optical axis direction (direction z) is directly exerted on the lens 4 and dislocates it.

As shown in FIG. 9, the contraction force of the adhesive 8 acting on the base wall 3h, as mentioned above, is extremely strong because it acts on the lens surface of the collimator lens 4 directly and perpendicularly thereto. By contrast, the adhesive 8 solidified at the tip of the support portion 3d drops from the tip and does not directly contract the lens surface. Therefore, the force of this part of the adhesive 8 is not critical. In light of this, the non-adhesion portion G2 terminating at the tip of the lens support portion 3d may be emitted, depending on the accuracy required of the light source device.

Referring again to FIGS. 3 and 4, the aperture forming member 5 has an aperture 5a and two pairs of lugs 5b and 5c for affixing the member 5 to the base 3. On the other hand, the base 3 has two pairs of arcuate positioning grooves 3f and 3g. After the collimator lens 4 has been fixed in place by the previously stated procedure, the aperture forming member 5 is positioned such that its lug pairs 5b and 5c respectively face the groove pairs 3f and 3g of the stepped portion 3h of the base 3. Then, the member 5 is pushed toward the base 3. As a result, the lug pairs 5b and 5c respectively mate with the groove pairs 3f and 3g, affixing the member 5 to the base 3.

Two slots 3i are formed at the right and left end portions of the base 3 and used to mount the light source device to a digital copier, laser printer or similar image forming apparatus. At this instant, the vertical surface or front 3j of the base and the outer circumferential surface of the stepped portion 3h are used as a reference for positioning.

FIGS. 10–13 each shows another specific configuration of the non-adhesion portions G1 and G2. The configuration shown in FIG. 10 lacks the annular recess 3k and simply increases the distance between the surface of the stepped portion 3h and the collimator lens 4 and the distance between the tip of the lens support portion 3d and the lens 4. This is the simplest configuration.

Figure 10:
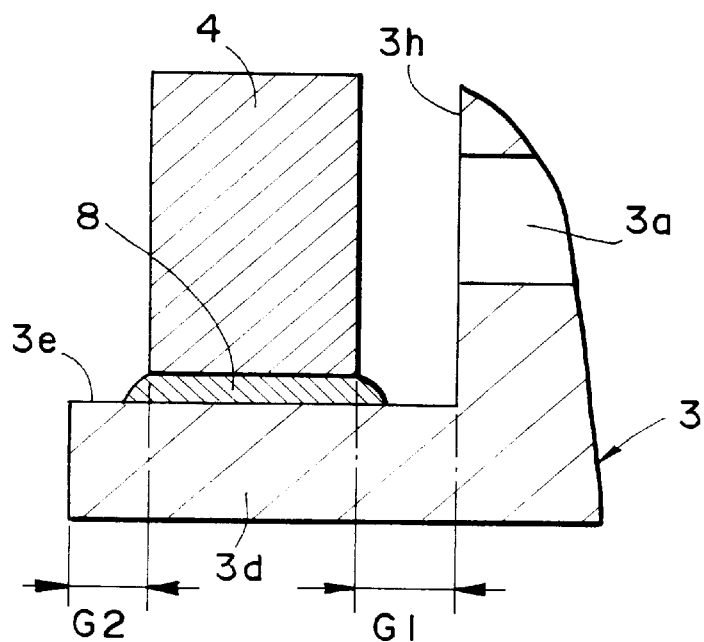
Figure 11:
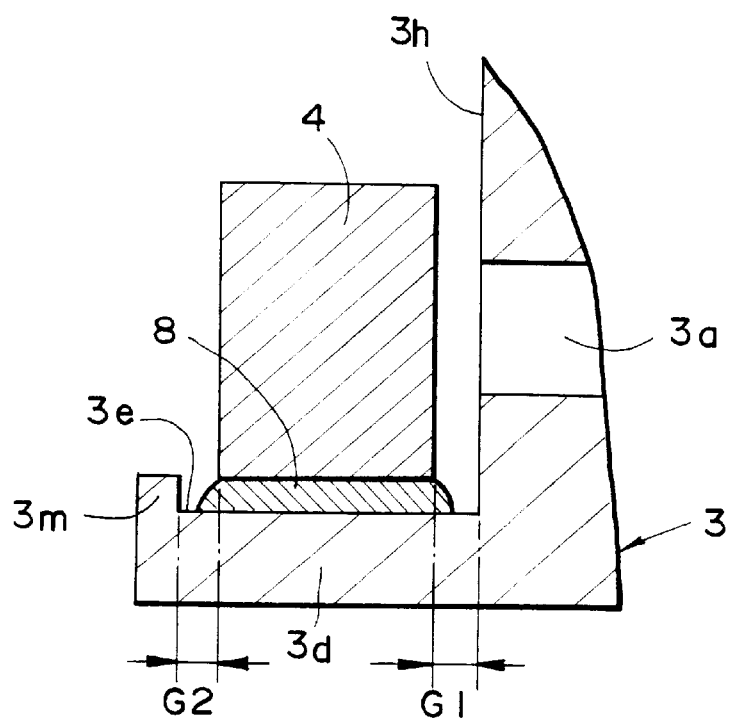

The configuration shown in FIG. 11 is a modification of the configuration of FIG. 10. As shown, an upright wall 3m extends from the tip of the surface 3e of the support portion 3d. The wall 3m surely prevents the excessing portion of the adhesive 8 from spreading over the tip of the support portion 3d.

Figure 12:
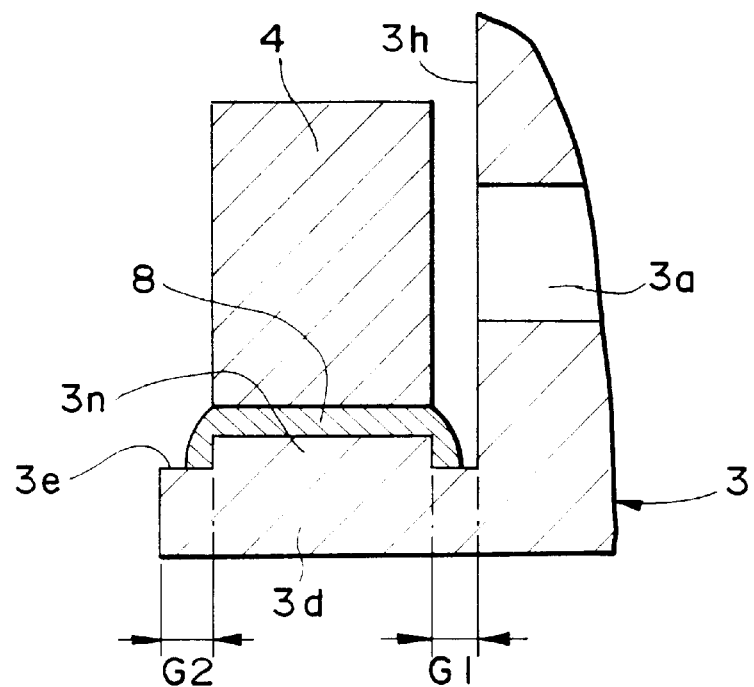

In FIG. 12, a table portion 3n having a width substantially identical with the thickness of the lens 4 is formed on the surface 3e of the support portion 3d. The lens 4 is adhered to the table portion 3n. In this configuration, the excessive part of the adhesive 8 is received in stepped portions located at both sides of the table 3n. Therefore, even when the adhesive 8 is fed in an excessive amount, its contraction force does not directly act on the lens surface so long as the the adhesive 8 received in the stepped portions does not rise above the lower edge of the lens 4.

Figure 13:
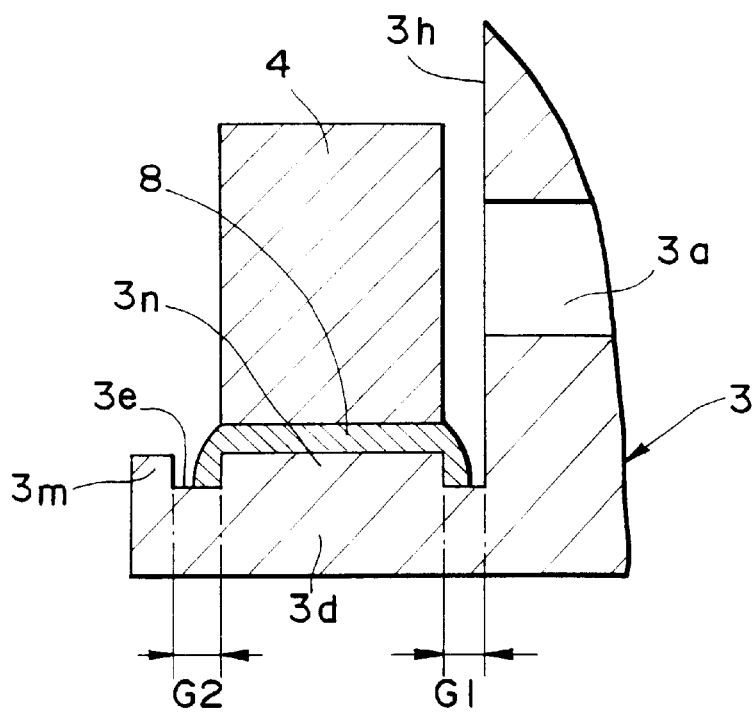

The configuration shown in FIG. 13 is a modification of the configuration of FIG. 12. As shown, the table portion 3n shown in FIG. 12 is combined with the upright wall 3m shown in FIG. 11. This also prevents the adhesive 8 from spreading over the tip of the support portion 3d.

While the adhesive 8 of the illustrative embodiment is ultraviolet light curable adhesive, it is only illustrative and may be replaced with any other adhesive so long as it is photo-curable.

The embodiment described above has the following advantages.

(1) Because a collimator lens is directly affixed to a lens support portion formed integrally with a base, a light source device needs a minimum number of parts and is low cost. Further, the device does not include any portion to be fastened by screws and therefore frees its structural parts from displacement due to fastening, thereby achieving high accuracy.

(2) The device allows the collimator lens to be fixed in place by photo-curable adhesive despite that it prevents light issuing from a semiconductor laser from leaking in directions other than the optical axis direction.

(3) The collimator lens is adhered to the lens support portion having an arcuate shape by the photo-curable adhesive. This allows setting light to be radiated toward the adhesive layer from above the lens, thereby setting the adhesive. Because the support portion and the optical axis of the laser are coaxial, the adhesive layer formed between the support portion and the lens has a uniform thickness and solidifies evenly. Therefore, the device prevents the lens from being dislocated due to the contraction of the adhesive in the event of hardening.

(4) Because the adhesive layer contacts only the lower half of the outer circumference of the lens, the contraction has directivity. It is therefore possible to provide the initial position of the lens with an offset, taking account of a certain degree of contraction. This enhances the positional accuracy of the lens after it has been fixed in place. Because the setting or curing light can be easily radiated from above the lens, the irregular hardening is further obviated, and the positional accuracy is further enhanced.

(5) Strains due to the contraction and acting in the right-and-left direction (direction x) are symmetrical and cancel each other. This limits the contraction only to the up-and-down direction (direction y) and thereby further improves the directivity of the contraction. Consequently, the device can be adjusted more accurately.

(6) A non-adhesive portion intervenes between the wall of the base and the lens. Even when the adhesive is fed in an excessive amount, the non-adhesion portion prevents it from directly depositing on the wall of the base; otherwise, the excessive developer would deposit and solidify on the wall of the base and exert an intense contraction force on the lens in the optical axis direction (direction z). This enhances accurate positioning in the optical axis direction.

(7) Another non-adhesion portion intervenes between the lens and the tip of the lens support portion. This non-adhesion portion prevents the adhesive from spreading as far as the tip of the support portion and solidifying there. This further enhances accurate positioning in the optical axis direction.

(8) The base for mounting the laser and lens thereon is formed of insulating resin having a coefficient of linear expansion of $2.3 \times 10^{-5}$/K or below in the optical axis direction, and a thermal conductivity of 0.9 W/m·K or above. Therefore, despite that the laser generates heat, the temperature of the device rises only slightly above the temperature inside the body of an image forming apparatus. Moreover, such a temperature elevation does not cause the relative position of the laser and lens to change noticeably. Consequently, a stable collimation characteristic is maintained against changes in temperature.

(9) Because the base itself is insulative, a case surrounding the laser is fully electrically insulated without resorting to any special insulating structure. The device is therefore simple and low cost.

2nd Embodiment

Figure 14:
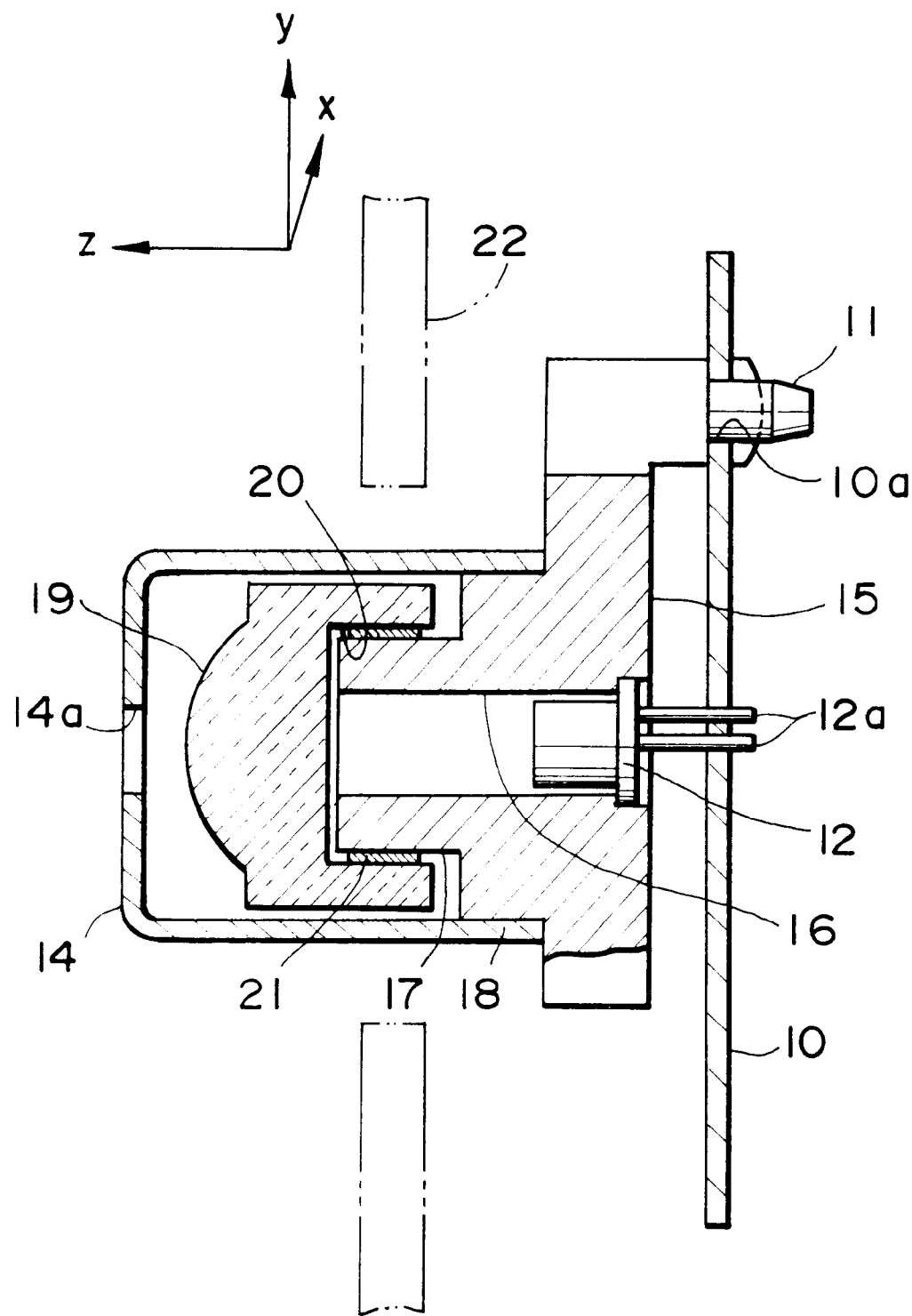
FIG. 14 is a vertical section showing a second embodiment of the present invention.

Referring to FIG. 14, an alternative embodiment of the present invention will be described. As shown, the light source device has a base or support member 15 formed with a stepped through bore 16 substantially at its center. A semiconductor laser 12 is press fitted in the bore 16. The base 15 is formed of a substance opaque to infrared rays (about 780 nm) and light having shorter wavelengths. The base 15 has on its outer surface a first cylindrical surface 18 and a second cylindrical surface 17 smaller in diameter than the first cylindrical surface 18. A guide pin 11 protruding from the right end of the base 15, as viewed in FIG. 14, is passed through a positioning hole 10a formed in a printed circuit board 10, and then affixed to the circuit board 10 by thermal deformation. The laser 12 and circuit board 10 are electrically connected together by leads 12a.

A collimator lens 19 is formed of a material transparent to ultraviolet rays. While the lens 19 may be implemented as a plastic lens or a glass lens, a glass lens is superior to a plastic lens as to optical characteristic. The lens 19 has at its right end, as viewed in FIG. 14, a recess 20 for forming a clearance of about 0.5 mm (at each side) between the lens 19 and the smaller diameter cylindrical surface 17. In this condition, when the cylindrical surface 17 is loosely fitted in the recess 20, the clearance allows the lens 19 to be adjusted in the directions x and y.

A method and a structure for supporting the collimator lens 19 on the base 15 are as follows. The lens 19 is held by a chuck, not shown, movable in the directions x, y and z, and then finely adjusted in the above three directions with the optical characteristic of the laser beam being monitored. After the lens 19 has been fully positioned, an ultraviolet radiator 22 radiates ultraviolet rays toward the assembly. Adhesive 21 is filled in the clearance between the cylindrical surface 17 and the lens 19 either entirely or at a plurality of positions. The ultraviolet rays cause the adhesive 21 to solidify in a short period of time. As a result, the lens 19 is affixed to the base 15. Of course, the thickness of the adhesive or adhesive layer 21 depends on the light source device. An aperture forming member 14 having an aperture 14a is press fitted on the cylindrical surface 18.

3rd Embodiment

Figure 15:
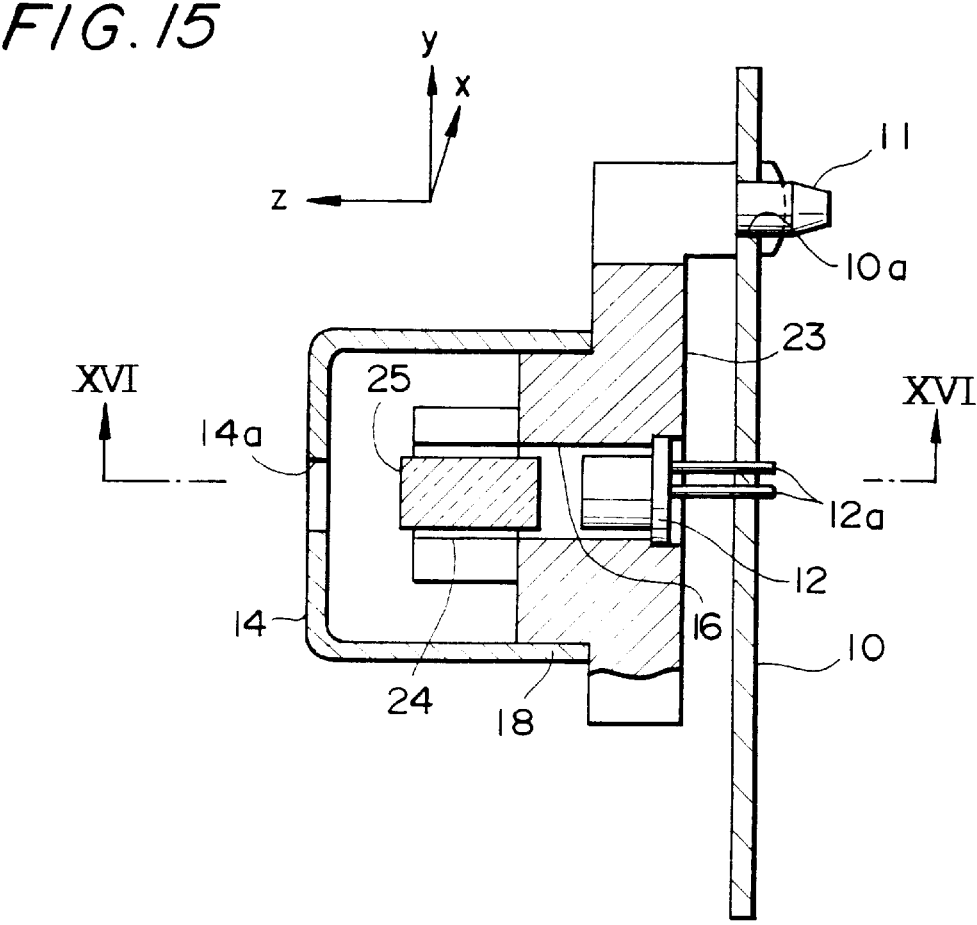
FIG. 15 is a vertical section showing a third embodiment of the present invention.
Figure 16:
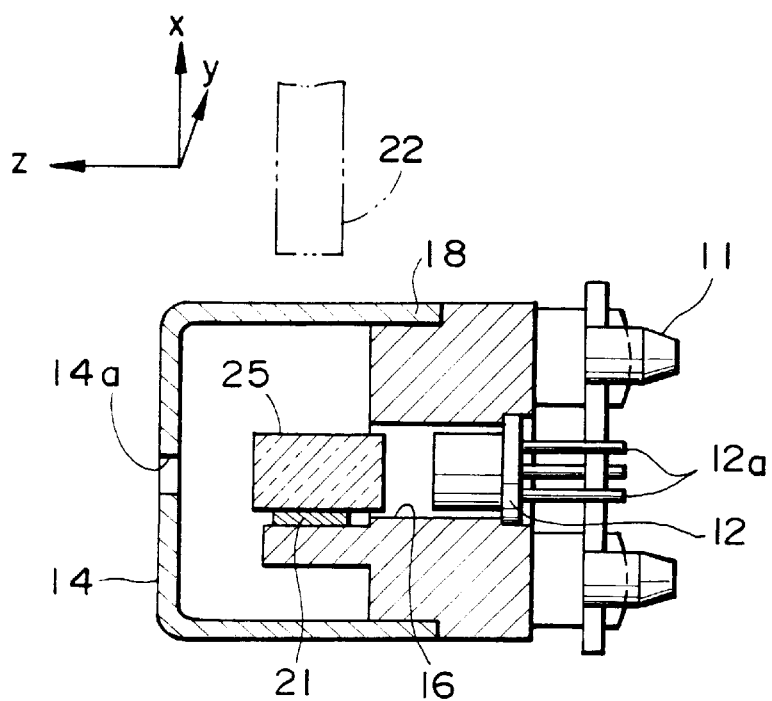
FIG. 16 is a section along line XVI—XVI of FIG. 15.

FIGS. 15 and 16 show another alternative embodiment of the present invention. In FIGS. 15 and 16, structural elements identical with the elements shown in FIG. 14 are designated by identical reference numerals. As shown, the light source device has a base or support member 23 formed of the same material as the base 15, FIG. 14. The semiconductor laser 12 is press fitted in the through bore 16 formed in the base 23. The guide pin 11 protruding from the right end of the base 23 is received in the hole 10a of the printed circuit board 10 and then deformed by heat. As a result, the circuit board 10 is affixed to the base 23. The aperture forming member 14 is press fitted on the cylindrical surface 18 of the base 23. The configuration described so far is identical with the configuration shown in FIG. 14.

In this embodiment, the smaller diameter cylindrical surface 17 is replaced with a recessed surface 24 contiguous with the greater diameter cylindrical surface 18. A cylindrical collimator lens 25 has an outer circumferential surface substantially parallel to the recessed surface 24. When the lens 25 is held by a chuck, not shown, movable in the directions x, y and z, a clearance of about 0.5 mm is formed between the lens 25 and the recessed surface 24.

The lens 25 is formed of the same material as the lens 19 of the second embodiment. The lens 25 is finely adjusted in the directions x, y and z with the optical characteristic of the laser beam being monitored. Subsequently, the adhesive 21 is filled in the clearance between the lens 25 and the surface 24. The ultraviolet radiator 22 radiates ultraviolet rays toward the assembly in order to cause the adhesive 21 to solidify in a short period of time. As a result, the lens 25 is affixed to the base 23 by the adhesive 21.

As stated above, the second and third embodiments described above have the following advantages.

(1) Because a of collimator lens is adjustable in three different directions (x, y and z), a single adjusting portion suffices. This reduces the number of structural parts of the light source device.

(2) Because a substantial clearance is available between the lens and a support member, the accuracy required of the individual part is eased. Hence, the light source device is low cost.

(3) The decrease in the number of parts obviates portions to be fastened by screws. This frees the parts from dislocation ascribable to fastening and enhances the accuracy of the device.

(4) Adhesive is hardened by ultraviolet rays transmitted through the lens. Hence, despite the structure preventing a laser beam from leaking in directions other than the optical axis direction, it is possible to illuminate the adhesive uniformly and cause it to fully harden. This obviates changes in the adhesive due to aging and frees it from irregular hardening and unhardened portions.

4th Embodiment

Figure 17:
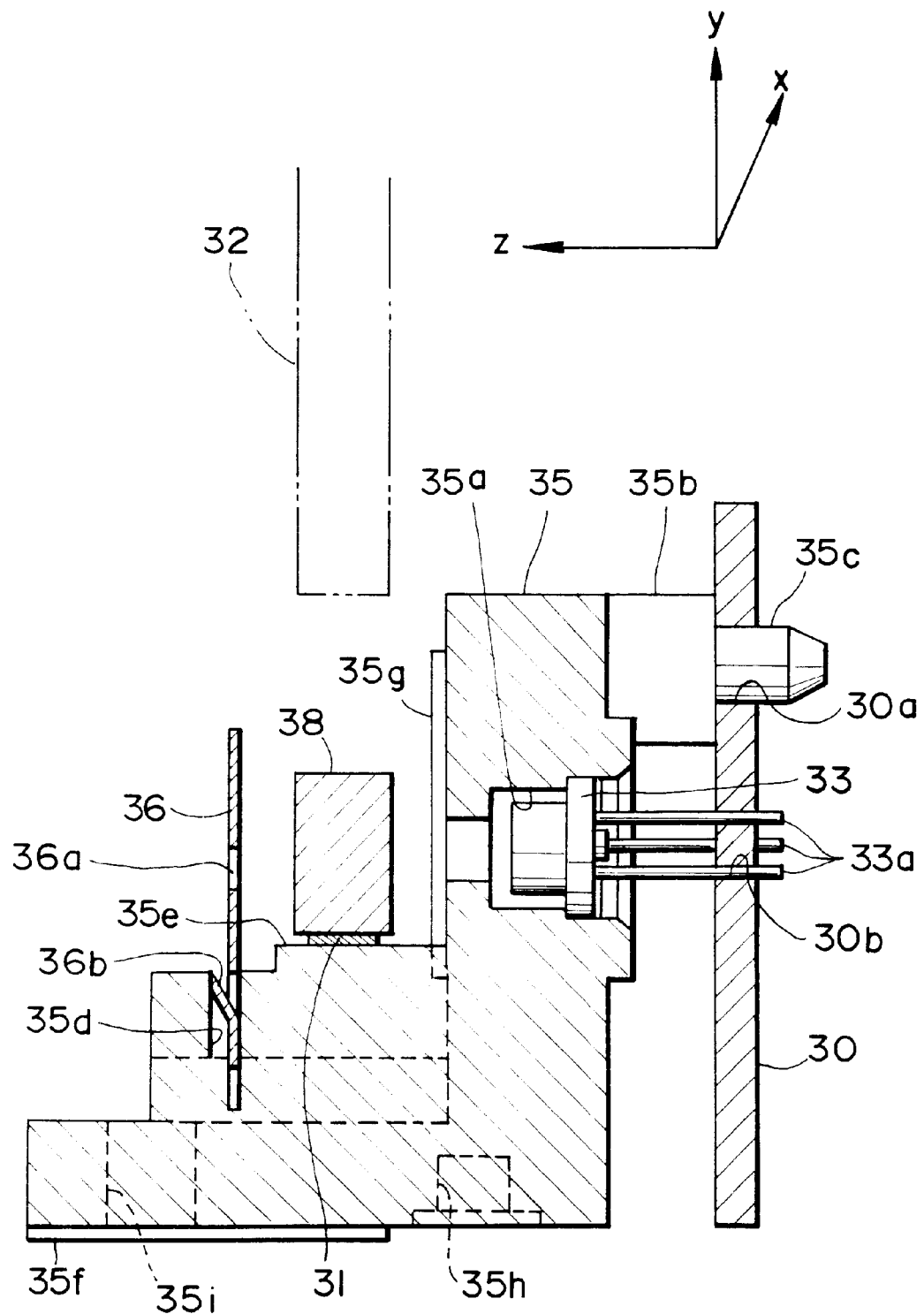
FIG. 17 is a vertical section showing a fourth embodiment of the present invention.
Figure 18:
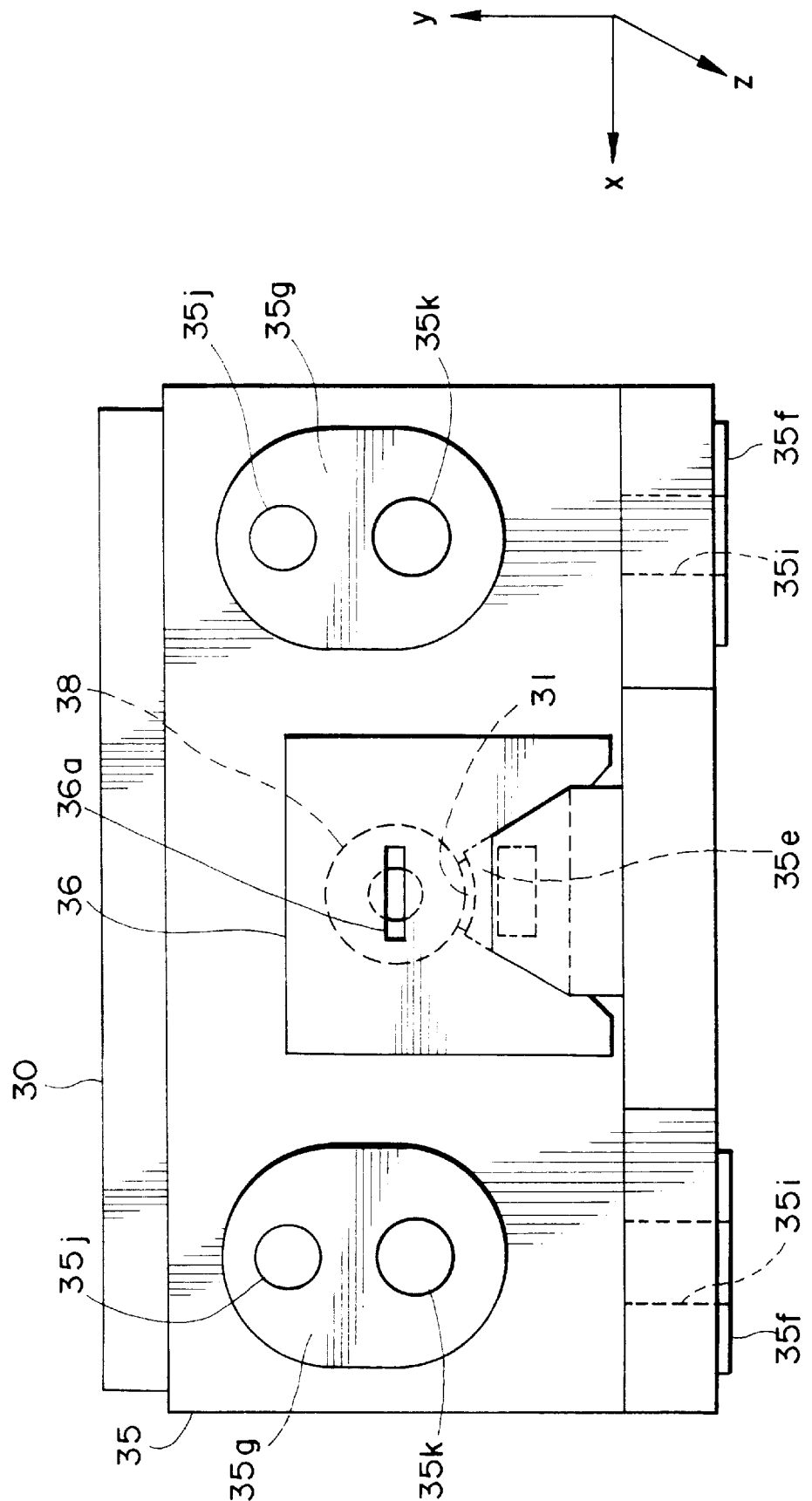
FIG. 18 is a plan view of the fourth embodiment.

Referring to FIGS. 17 and 18, a further alternative embodiment of the present invention will be described. As shown, the light source device has a semiconductor laser 33 for emitting laser light, a collimator lens 38 for collimating the laser light to output a substantially parallel beam, and a base or support member 35 supporting the laser 33. The base 35 is formed of a material opaque to light having wavelengths shorter than about 780 mm (infrared rays) inclusive.

The laser 33 is press fitted in a stepped through bore 35a formed in substantially the center of the base 35. A pair of spacers 35b are formed integrally with the base 35. Guide pins 35c each protrudes from the respective spacer 35b. A printed circuit board 30 is formed with positioning holes 30a slightly smaller in diameter than the guide pins 35c. The base 35 is affixed to the circuit board 30 with its guide pins 35 received in the positioning holes 30a. After the base 35 has been affixed to the circuit board 30, leads 33a extending out from the laser 33 are respectively passed through holes 30b formed in the circuit board 30. Then, the leads 33a are soldered to a conductive wiring pattern provided on the rear of the circuit board 30.

An aperture forming member 36 for forming an aperture 36a is partly cut and bent to form an elastic tongue 36b. The aperture forming member 36 is received in a groove 35d formed in the base 35 and is fixed in place due to the elasticity of the tongue 36b. The base 35 has a recessed surface 35e. A collimator lens 38 has a contour substantially parallel to the recessed surface 35e. The lens 38 is held by a chuck, not shown, adjustable in position in the directions x, y and z. A clearance of about 0.5 mm is formed between the collimator lens 38 and the surface 35e and filled with adhesive 31.

The collimator lens 38 is formed of a material transparent to ultraviolet rays. While the lens 38 may be implemented as a plastic lens or a glass lens, a glass lens is superior to a plastic lens in respect of optical characteristic. After the aperture forming member 36 has been affixed to the lens 38, it is finely adjusted in the directions x, y and z while the optical characteristic of the laser beam issuing via the aperture 36a is monitored. Then, the adhesive is filled in the clearance between the lens 38 and the surface 35e of the base 35. Subsequently, an ultraviolet radiator 32 radiates ultraviolet rays toward the assembly in order to cause the adhesive 31 to solidify in a short period of time. Because the lens 38 is transparent to ultraviolet rays, the adhesive 31 solidifies evenly and adheres the lens 38 to the base 35 while maintaining its collimation characteristic.

Assume that the above light source device is mounted to the body of a digital copier, laser printer or similar image forming apparatus or to a host unit. The base 35 is generally L-shaped and has a first reference surface 35f parallel to the optical axis, and a second reference surface 35g perpendicular to the optical axis. To mount the device to the apparatus body or the host unit from above the apparatus body, the device is positioned in the direction of rotation (directions x and y) by use of two positioning holes 35h. Then, screws are driven into two threaded holes 35i from above the device in order to fasten the device to the apparatus body with the first reference surface 35f contacting the reference surface of the apparatus body. To mount the device to the apparatus body from one side of the apparatus body, the device is positioned in the direction of rotation (directions x and y) by use of two positioning holes 35j and then fastened to the side of the apparatus body via two threaded holes 35k. In this case, the second reference surface 35g contacts the reference surface of the apparatus body.

The light source device may be assembled and adjusted by an automatic machine by the following procedure. First, the base 35 is positioned such that its second reference surface 35g extends horizontally. Then, the leads 33a of the laser 33 are soldered to the conductive wiring pattern of the circuit board 30 from above the circuit board 30. The optical characteristic of the device is adjusted with the first reference surface 35f held in a horizontal position. The steps of inserting the aperture forming member 36, applying the adhesive 31, positioning the collimator lens 38, radiating ultraviolet rays are all effected from above the device, so that the automatic assembly is facilitated.

Of source, the first and second reference surfaces 35f and 35g may each be implemented by a respective support member. The aperture forming member 36 and collimator lens 38 may be affixed to a single member, or each may be affixed to a respective member. The member or members to which the member 36 is affixed may be formed integrally with or separately from the base 35. Even when the surface where the lens 38 is located is different from the horizontal reference surface, it does not effect the collimation characteristic of the lens 38 because the lens 38 is affixed to the base 35 after the optical characteristics of the lens 38 including the collimation characteristic have been examined.

The fourth embodiment described above has the following advantages.

(1) The light source device has a first and a second reference surface respectively perpendicular and parallel to the optical axis of a semiconductor laser. A collimator lens is fixed in place with its optical axis aligned with that of the laser. Hence, the device can be readily mounted to an apparatus body or host unit without having its collimation characteristic deteriorated.

(2) Because a base is implemented as a single molding, the device needs a minimum number of parts and is therefore low cost.

(3) The decrease in the number of parts obviates portions to be fastened by screws. This eliminates the dislocation of the individual part ascribable to fastening using screws and thereby provides the device with high accuracy.

(4) Ultraviolet light curable adhesive is solidified by ultraviolet rays transmitted through the lens. It is therefore possible to fully harden the adhesive by uniform radiation, and therefore to obviate irregular hardening and unhardened portions.

(5) Light issuing from the laser does not lead in directions other than the optical axis direction, so that the adhesive is free from variation ascribable to aging.

(6) The focus of the lens can be adjusted after an aperture forming member has been mounted. This prevents the optical characteristic from being varied after the mounting of the aperture forming member.

(7) Because the device has the first and second reference surfaces respectively perpendicular and parallel to the optical axis of the laser, it can be mounted to an apparatus body or host unit from above or from one side of the apparatus body, as desired. This provides the device with general-purpose applicability.

(8) The first reference surface allows the mounting of the aperture forming member, the application of the adhesive, the positioning of the lens and the radiation of ultraviolet rays to be effected from above the device without exception. These facilitate the automatic assembly and adjustment of the device.

Various modifications will become possible for those skilled in the art after receiving the teachings of the present disclosure without departing from the scope thereof.

What is claimed is:

1. A light source device comprising:

first supporting means having a through bore;

means for emitting laser light, said emitting means being mounted on a rear of said first supporting means and fitted in said through bore, and wherein said emitting means comprises a semiconductor;

means for focusing light, said focusing means being mounted on a front of said first supporting means at a front of said through bore and coaxial with an optical axis of said emitting means; and second supporting means positioned at the front of said through bore coaxially with the optical axis of said emitting means, said second supporting means having an arcuate end and having a diameter slightly greater than an outside diameter of said focusing means;

wherein said focusing means is affixed to said second supporting means by photo-curable adhesive.

2. A light source device as claimed in claim 1, wherein said second supporting means is formed integrally with said first supporting means.

3. A light source device as claimed in claim 1, wherein said second supporting means has an arc smaller than a semicircle.

4. A light source device as claimed in claim 1, wherein said second supporting means has an arc symmetrical in a right-and-left direction.

5. A light source device as claimed in claim 1, further comprising means for shaping light output from said focusing means.

6. A light source device as claimed in claim 1, wherein said focusing means comprises a collimator lens.

7. A light source device as claimed in claim 1, wherein a first non-adhesion portion is formed at least between said focusing means affixed to said second supporting means and a wall of said first supporting means.

8. A light source device as claimed in claim 7, wherein said first non-adhesion portion comprises an annular recess formed in said wall of said first supporting means concentrically with said through bore.

9. A light source device as claimed in claim 7, wherein said first non-adhesion portion comprises a groove having a width greater than a thickness of said focusing means.

10. A light source device as claimed in claim 7, wherein said non-adhesion portion comprises a table portion having a length substantially identical with a thickness of said focusing means.

11. A light source device as claimed in claim 7, wherein a second non-adhesion portion is formed between said focusing means and a tip of said second supporting means.

12. A light source device as claimed in claim 1, wherein said first supporting means comprises insulating resin having a coefficient of linear expansion of less than $2.3 \times 10^{-5}$/K inclusive in a direction of the optical axis, and a thermal conductivity of greater than 0.9 W/m×K inclusive.

13. A method for producing light comprising, the steps of:
mounting a semiconductor laser on a rear of a flat base member, said semiconductor laser being fitted in a through bore and emitting laser light;
mounting a lens on a front of said base member at a front of said through bore coaxially with an optical axis of said semiconductor laser; and
positioning a lens support member at the front of said through bore coaxially with the optical axis of said semiconductor laser, said lens support member having an arcuate section and having a diameter slightly greater than a n outside diameter of said lens;
wherein said lens is affixed to said lens support member by a photo-curable adhesive.

14. A method for producing light as claimed in claim 13, wherein said step of positioning said lens support member further comprises positioning said lens support member at the front of said through bore coaxially with the optical axis of said semiconductor laser, said lens support member being formed integrally with said base member.

15. A method for producing light as claimed in claim 13, wherein said step of positioning said lens support member further comprises positioning said lens support member at the front of said through bore coaxially with the optical axis of said semiconductor laser, said lens support member having an arc smaller than a semicircle.

16. A method for producing light as claimed in claim 13, wherein said step of positioning said lens support member further comprises positioning said lens support member at the front of said through bore coaxially with the optical axis of said semiconductor laser, said lens support member having an arc symmetrical in a right-and-left direction.

17. A method for producing light as claimed in claim 13, further comprising the step of shaping the laser light output from said lens by an aperture forming member.

18. A method for producing light as claimed in claim 13, wherein said step of mounting said lens further comprises mounting the lens on the front of said base member at the front of said through bore coaxially with an optical axis of said semiconductor laser, said lens comprising a collimator lens.

19. A method for producing light as claimed in claim 13, further comprising a first forming step, wherein a first non-adhesion portion is formed at least between said lens affixed to said lens support member and a wall of said base member.

20. A method for producing light as claimed in claim 19, wherein said first forming step further comprises forming said first non-adhesion portion at least between said lens affixed to said lens support member and said wall of said base member, said first non-adhesion portion comprising an annular recess formed in said wall of said base member concentrically with said through bore.

21. A method for producing light as claimed in claim 19, wherein said first forming step further comprises forming said first non-adhesion portion at least between said lens affixed to said lens support member and said wall of said base member, said first non-adhesion portion comprising a groove having a width greater than a thickness of said lens.

22. A method for producing light as claimed in claim 19, wherein said first forming step further comprises forming said first non-adhesion portion at least between said lens affixed to said lens support member and said wall of said base member, said first non-adhesion portion comprising a table portion having a length substantially identical with a thickness of said lens.

23. A method for producing light as claimed in claim 19, further comprising a second forming step, wherein a second non-adhesion portion is formed between said lens and a tip of said lens support member.

24. A method for producing light as claimed in claim 13, wherein said step of mounting said semiconductor laser further comprises mounting the semiconductor laser on the rear of said base member, said base member comprising insulating resin having a coefficient of linear expansion of less than $2.3 \times 10^{-5}$/K inclusive in a direction of the optical axis and a thermal conductivity of greater than 0.9 W/m×K inclusive.

* * * * *